(12) United States Patent
Grauer et al.

(10) Patent No.: US 9,214,084 B2
(45) Date of Patent: Dec. 15, 2015

(54) SMART TRAFFIC SIGN SYSTEM AND METHOD

(71) Applicant: BRIGHTWAY VISION LTD., Haifa (IL)

(72) Inventors: Yoav Grauer, Haifa (IL); Ofer David, Haifa (IL); Ya'ara David, Kiryat Tiv'on (IL); Haim Garten, Haifa (IL); Alon Krelboim, Haifa (IL); Sharon Lifshits, Haifa (IL); Oren Sheich, Yoqneam (IL)

(73) Assignee: BRIGHTWAY VISION LTD., Haifa (IL)

( * ) Notice: Subject to any disclaimer, the term of this patent is extended or adjusted under 35 U.S.C. 154(b) by 0 days.

(21) Appl. No.: 14/362,975

(22) PCT Filed: Dec. 3, 2012

(86) PCT No.: PCT/IL2012/050493
§ 371 (c)(1),
(2) Date: Jun. 5, 2014

(87) PCT Pub. No.: WO2013/084225
PCT Pub. Date: Jun. 13, 2013

(65) Prior Publication Data
US 2014/0320317 A1    Oct. 30, 2014

Related U.S. Application Data

(60) Provisional application No. 61/566,700, filed on Dec. 5, 2011.

(51) Int. Cl.
*G08G 1/16* (2006.01)
*G08G 1/09* (2006.01)
(Continued)

(52) U.S. Cl.
CPC . *G08G 1/09* (2013.01); *G01S 17/08* (2013.01); *G01S 17/88* (2013.01); *G08G 1/096716* (2013.01); *G08G 1/096758* (2013.01); *G08G 1/096783* (2013.01)

(58) Field of Classification Search
CPC ......... G08G 1/095; G08G 1/20; G08G 1/087; G08G 1/0965; G08G 1/0955; B60Q 1/54; B60Q 1/50; B60Q 1/001; B60Q 1/14; B60Q 1/141; G01S 17/89; G01S 17/02; G01S 7/484; G01S 7/51
USPC ......... 340/907, 991, 928, 906, 905, 901, 441, 340/468, 541, 902–904, 933; 701/70, 117; 398/23, 130
See application file for complete search history.

(56) References Cited

U.S. PATENT DOCUMENTS 3,697,941 A * 10/1972 Christ ........................... 340/991
5,150,116 A *  9/1992 West ............................. 340/928
(Continued)

FOREIGN PATENT DOCUMENTS

EP    1544828    5/2008
EP    2306434    4/2011

OTHER PUBLICATIONS

International Search Report of PCT Application No. PCT/IL2012/050493 mailed on Mar. 21, 2013.

*Primary Examiner* — Hoi Lau
(74) *Attorney, Agent, or Firm* — Pearl Cohen Zedek Latzer Baratz LLP (57) ABSTRACT

A system for increasing awareness of a driver to traffic-signs on the road is provided herein. The system includes: a sensor attached to a vehicle and configured to determine a type of one or more traffic-signs that are present in a scene containing the vehicle, wherein at least some of the traffic-signs are time-variant traffic-signs which present time-variant visual indicators; and a controller configured to: monitor and analyze, in real time: relative metrics indicative of one or more spatial relations between the vehicle and the one or more detected traffic-signs; and temporal data associated with the time-variant visual indicators of the time-variant traffic-signs; apply one or more decision functions to at least two of: the detected one or more traffic-signs and to the monitored relative metrics, and the temporal data associated with the time-variant visual indicators, so as invoke an action selected from a predefined set of actions.

14 Claims, 7 Drawing Sheets

(51) Int. Cl.
  *G01S 17/88*  (2006.01)
  *G01S 17/08*  (2006.01)
  *G08G 1/0967* (2006.01)

(56) References Cited

U.S. PATENT DOCUMENTS

| | | | | |
|---|---|---|---|---|
| 5,187,476 | A * | 2/1993 | Hamer | 340/906 |
| 5,633,629 | A * | 5/1997 | Hochstein | 340/907 |
| 5,831,551 | A * | 11/1998 | Geduld | 340/905 |
| 6,515,596 | B2 * | 2/2003 | Awada | 340/905 |
| 6,864,784 | B1 * | 3/2005 | Loeb | 340/441 |
| 7,280,674 | B2 * | 10/2007 | Matveev | 382/104 |
| 7,397,390 | B2 * | 7/2008 | DiPiazza | 340/905 |
| 7,427,928 | B2 * | 9/2008 | Crocker et al. | 340/902 |
| 7,764,194 | B2 * | 7/2010 | Osanai | 340/907 |
| 7,859,428 | B2 * | 12/2010 | Boss et al. | 340/905 |
| 8,184,003 | B1 * | 5/2012 | Nichols | 340/541 |
| 8,350,723 | B2 * | 1/2013 | Serex | 340/905 |
| 8,892,342 | B2 * | 11/2014 | Yamada et al. | 701/117 |
| 2002/0101360 | A1 * | 8/2002 | Schrage | 340/901 |
| 2003/0193981 | A1 * | 10/2003 | Matveev | 372/69 |
| 2003/0198271 | A1 * | 10/2003 | Matveev | 372/92 |
| 2005/0269481 | A1 * | 12/2005 | David et al. | 250/208.1 |
| 2005/0280552 | A1 * | 12/2005 | DiPiazza | 340/905 |
| 2005/0280553 | A1 * | 12/2005 | DiPiazza | 340/905 |
| 2007/0242337 | A1 * | 10/2007 | Bradley | 359/237 |
| 2007/0242338 | A1 * | 10/2007 | Bradley | 359/237 |
| 2007/0242339 | A1 * | 10/2007 | Bradley | 359/237 |
| 2008/0122606 | A1 * | 5/2008 | Bradley | 340/468 |
| 2008/0122607 | A1 * | 5/2008 | Bradley | 340/468 |
| 2008/0310850 | A1 * | 12/2008 | Pederson et al. | 398/135 |
| 2013/0099943 | A1 * | 4/2013 | Subramanya | 340/933 |
| 2014/0320317 | A1 * | 10/2014 | Grauer et al. | 340/907 |
| 2015/0046055 | A1 * | 2/2015 | Yamada et al. | 701/70 |
| 2015/0078741 | A1 * | 3/2015 | O'Connor et al. | 398/23 |
| 2015/0160340 | A1 * | 6/2015 | Grauer et al. | 356/5.04 |

* cited by examiner

SMART TRAFFIC SIGN SYSTEM AND METHOD

CROSS-REFERENCE TO RELATED APPLICATIONS

This application is a National Phase Application of PCT International Application No. PCT/IL2012/050493, International Filing Date Dec. 3, 2012, entitled "SMART TRAFFIC SIGN SYSTEM AND METHOD", published on Jun. 13, 2013 as International Publication Number WO 2013/084225, claiming priority of U.S. Patent Application No. 61/566,700, filed Dec. 5, 2011, both of which are incorporated herein by reference in their entirety.

BACKGROUND

1. Technical Field

The present invention relates to systems and method adapted to improve and aid driving of motor vehicles by users, as well as, increase awareness of the driver to traffic signs and the driver's surroundings.

2. Discussion of the Related Art

While driving a vehicle, drivers may, at times, become less aware or otherwise become oblivious to certain road conditions, as could happen during a mundane and/or a monotonous drive, or even when the attention of the driver may be diverted as a result of, for example, road sceneries, cell phone calls, radio stations tuning and so forth. During such distractions, the driver may not observe certain traffic signs, traffic lights and/or other road conditions, such as those indicating impending dangers and other hazards. Common dangerous example is a vehicle approaching a traffic light indicating a "Green" light, while the vehicle is in a short to none stopping distance from the traffic light; light indication has changed to "Red" leaving the driver in an unclear and dangerous situation how to respond. In these and other instances, the driver may delay response to such conditions and/or the driver may hesitate or otherwise become confused in reacting, i.e., wrongfully, accelerating, decelerating, applying brakes etc., of the vehicle thereby further risking the driver and/or the driver's surroundings. Another aspect may be an unevenly traffic flow control due to unexpected acceleration/deceleration of vehicles approaching traffic sign and/or traffic light indications. In addressing such shortcomings, certain prior art systems have been conceived such as described in U.S. Pat. No. 7,859,428 B2, titled "system and method for electronic road signs with in-car display capabilities", where wireless network system transmitters indicate road sign to mobile computing device in the vehicle by wireless signal. The system described in '428 B2 patent is based on wireless communication network, which does not offer a localization information (e.g. range and orientation to relevant traffic sign indication). For example, a vehicle approaching a junction with several traffic signs may be indicated with a wrong or irrelevant traffic sign indication as the wireless network described is transmitting a radial signal which is a scalar (e.g. with no specific orientation). Another drawback of '428 B2 patent is directly associated with the mass infrastructure that may be required to distribute the mesh of wireless transmitters along the road. An additional prior art is described in EU Patent No. EP 1 544 828 B1, titled "optical communication equipment and vehicle control method", where a road sign is indicated by an optical communication transmission received in an inter-vehicle optical messaging equipment. The system described in '828 B1 patent does not offer multiple indication areas (e.g. prior approaching vehicle) with different optical information as required, for example, when coupled to a traffic light indication. Additional certain prior art systems have been conceived, including driver aid imaging systems (e.g. camera based and alike) detecting road signs and/or navigation based tools utilizing Global Position System and/or digital maps and/or vision based camera modules etc. Notwithstanding their availability, such prior art systems have not been able to provide adequate solutions to the above shortcomings Before describing the invention method regarding vehicular systems based on a receiver and traffic signs, the following definitions are put forward.

The term "Near Infra-Red" (NIR) as used herein is a part of the Infra-Red spectrum with wavelength between 700 to 2000 nanometers.

The term "Field Of View" (FOV) as used herein is the angular extent of a given scene, delineated by the angle of a three dimensional cone that is imaged onto an image sensor of a camera, the camera being the vertex of the three dimensional cone. The FOV of a camera at particular distances is determined by the focal length of the lens and the active image sensor dimensions.

The term "Field Of Illumination" (FOI) as used herein is the angular extent of a given scene, delineated by the angle of a three dimensional cone that is illuminated from an illuminator (e.g. LED, LASER, flash lamp, etc.) or reflected from a surface (e.g. Lambertian, retro-reflector, etc.), the illuminator or the reflecting surface being the vertex of the three dimensional cone. The FOI of an illuminator at particular distances is determined by the focal length of the lens and the illuminator illuminating surface dimensions. The FOI of a reflecting surface at particular distances is determined by the type of reflecting surface, the incident illumination Angle Of Arrival (AOA) and the surface illuminated/reflected dimensions.

BRIEF SUMMARY

It is an object of the disclosed technique to provide a novel safety assistant 'add on' system for a vehicle with a receiver adapted to receive the pulsed and/or modulated signals and with signal processor adapted to compare the received pulsed and/or modulated signals with predefined parameters associated with the road indicator for determining the type of the road indicator and to analyze the relative conditions between the vehicle and the road indicator, wherein said system is adapted to act according to the analyzed relative conditions between the vehicle and the defined road indicator in order to increase vehicle and driver safety.

In accordance with the disclosed technique there is thus provided a system formed of two main modules. The system includes a pulsed and/or modulated NIR indication illuminator module, and a second module includes a receiver module adapted to receive the pulsed and/or modulated NIR signals transmitted by the illuminator module. Accordingly, the receiver module has an ability to lock on pulsed and/or modulated signals generated by the illuminator module. NIR indication illuminator module is adapted to provide NIR illumination in accordance with certain existing specific electro-optical characteristics, as discussed further below, associated and correlated with a traffic indicator. For example, an indication illuminator module providing signals indicative of a road stop sign provides illumination signals having certain electro-optical characteristics indicating that it is a stop sign, while that of a yield sign provides an illuminator module illumination signals having electro-optical characteristics of a yield sign. By further example, a traffic light signal provides an illuminator module illumination signals having electro-optical characteristic indicating that it is such a road indication, and so forth.

In accordance with another embodiment of the disclosed technique there is thus provided a system formed of three main modules. The system includes a transmitter module includes a receiver module adapted to receive the pulsed and/or modulated NIR signals reflected by the indication modulation module. Accordingly, the receiver module has an ability to lock on pulsed and/or modulated signals generated by the transmitter module which are reflected by modulation module. Transmitter module is adapted to provide a Continuous Wave (CW) NIR illumination. This CW illumination is modulated and reflected by the modulation module and received by the receiver module, associated and correlated to the traffic indicator. For example, an modulation module reflecting pulsed and/or the modulated signals indicative of a road stop sign having certain electro-optical characteristics indicating that it is a stop sign, while that of a yield sign provides reflecting pulsed and/or modulated signals having electro-optical characteristics of a yield sign. By further example, a traffic light signal provides a reflected illumination signals from the modulation module having electro-optical characteristic indicating that it is such a road indication, and so forth.

Further embodiments of the present technique provide a motor vehicle having a receiver module adapted for sensing those signals provided by NIR illuminator module or by modulation module reflection signals, such as those indicative of the various road indications, as the vehicle approaches the FOI caused by the illuminator module or by the modulation module reflection. Accordingly, the receiver module senses the illumination signals and, based on the electro-optical characteristics of the signal, the receiver module is able to provide the driver with indications relating to the type of road sign, road condition, traffic light advisable indication or other surrounding and impending conditions the driver may be approaching or otherwise expected to encounter. An example of such traffic light advisable indication may be a traffic light indicating a "Green" light but suppose to change to a "Red" light in a short time; illuminator module FOI or modulation module FOI provides indication of "Red" light, from a certain designated distance from the traffic light, to the receiver module, providing a sufficient response time for approaching vehicle and driver as to the traffic light indication.

In certain embodiments, the above receiver module and/or transmitter module can be standalone modules or integral parts of existing modules included in the vehicle. In addition to systems previously existing in the vehicle, or those previously installed within the vehicle, including alert-based systems with which today's vehicles are equipped, such as electro-optical day and/or night sensors for various applications including day/night vision features adapted for lane departure warning, pedestrian detection, traffic sign recognition and etc., the proposed technique further provides additional capabilities and features for enhancing driving experience and safety. Thus, the system and methods of the present disclosure provide an automatic warning system that enhances the overall driving experience and even activate different vehicle systems such as vehicle brakes, vehicle head lights and alike. The disclosed technique may utilize and exploit, for example, some of the already installed systems and sensors within a vehicle, such as the vision sensors (cameras) modules for day and/or night vision for providing the driver with an enhanced environment indicative of road conditions the driver is bound to experience. The disclosed technique may further utilize and exploit, for example, some of the already installed systems and sensors within a vehicle such as illumination in the non-visible spectrum and/or the vehicle radio (i.e. an audio alert) and/or vehicle display (i.e. a visual alert) to provide the automatic system warning to the driver.

It should be born in mind that in addition of using pulsed and/or modulated electromagnetic waves, the present technique can also be adapted to use other types of pulsed and/or modulated signals, or other types of waves, such as ultrasonic waves or any type of waves which can be bounded to a specific FOI, in providing the above mentioned traffic sign warning system. It should further be born in mind that the present technique is not limited to being used only in road systems and/or motor vehicles, but rather techniques disclosed herein are well adapted to being implemented in other transportation platforms, including but not limited to, trains and railroad systems, maritime, i.e., ships and ports, aviation, i.e., airplane takeoff, landing and/or taxing on runways and so forth. Hence, the present technique provides a comprehensive tool for addressing safety and other related needs, such as those encountered in various local and/or global transportation industries and settings.

Other aspects of the present technique may include a system arranged to execute the aforementioned method. These additional and/or other aspects and/or advantages of the embodiments of the present technique are set forth in the detailed description which follows; possibly inferable from the detailed description; and/or learnable by practice of the embodiments of the present invention.

BRIEF DESCRIPTION OF THE DRAWINGS

For a better understanding of embodiments of the present technique and to show how the same may be carried into effect, reference will now be made, purely by way of example, to the accompanying drawings in which like numerals designate corresponding elements or sections throughout.

In the accompanying drawings.

DETAILED DESCRIPTION

Figure 1:
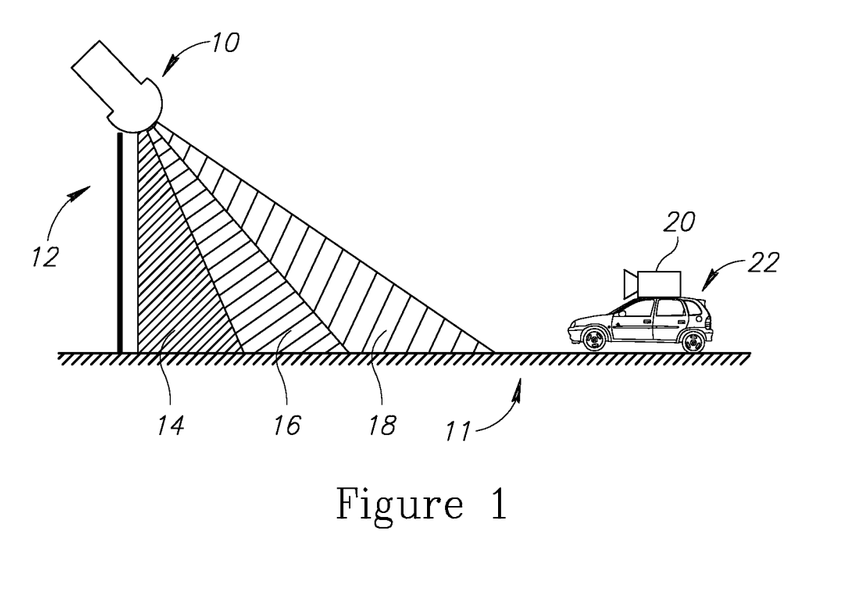
FIG. 1 illustrates a side view of a traffic system, in accordance with an embodiment of the present technique.
Figure 2:
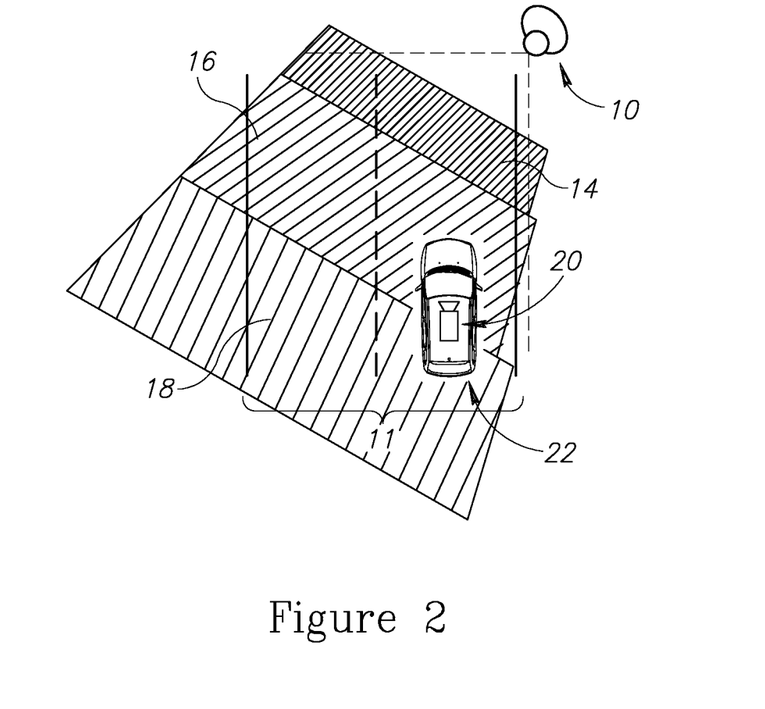
FIG. 2 illustrates a top view of a traffic system, in accordance with an embodiment of the present technique.

FIG. 1 and FIG. 2, present an illuminator module 10 positioned near or on a traffic sign 12, providing a clear FOI to incoming traffic, such as vehicle 22 with a receiver module 20 traveling on a route 11. Illuminator module 10 FOI may be divided to zones 14, 16, and 18. Traffic sign 12 may be any conventional and known traffic sign, such as a stop sign, yield sign and alike, whereby each sign may have its own illumination characteristics and FOI zones 14, 16, and 18, respectively, such as provided by illuminator module 10. Accordingly, each of the signs and its associated FOI zones 14, 16, and 18 having unique electro-optical characteristics typifying the type of sign used, typifying the distance to sign, typifying the closing velocity to sign and alike. In other words, a stop sign utilizes an illuminator module having FOI zones 14, 16, and 18 typified by particular electro-optical characteristics, while a yield sign may utilize an illuminator module 10 having other types of electro-optical characteristics.

Figure 3A:
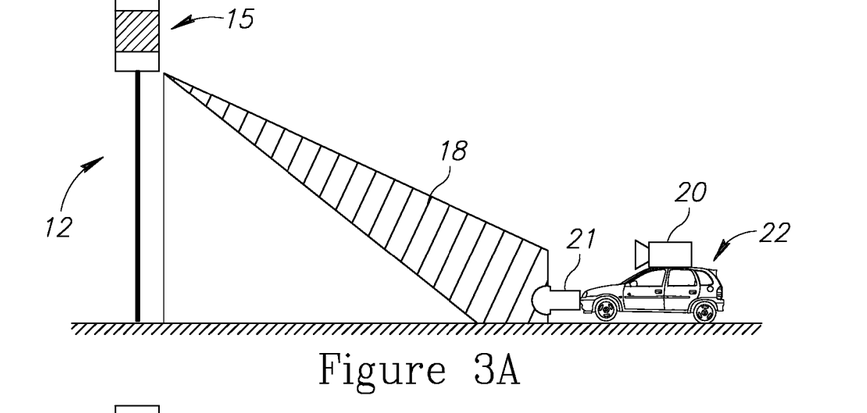
FIG. 3A-FIG. 3C illustrate a side view of a traffic system in different distances, in accordance with another embodiment of the present technique.
Figure 3B:
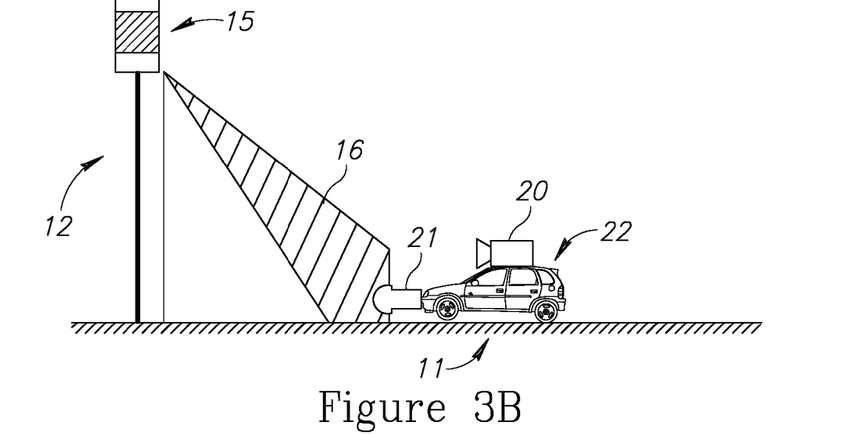
Figure 3C:
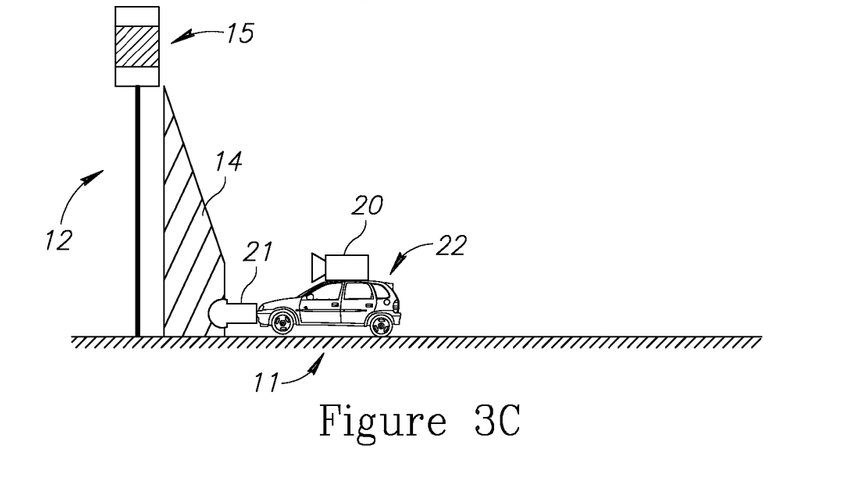

FIG. 3A-FIG. 3C, provide a modulation module 15 located on or near traffic sign 12, such as vehicle 22 with at least one transmitter module 21 and receiver module 20 which receives pulsed and/or modulated reflection. Modulation module 15 reflected FOI may be divided to zones 14, 16, and 18. Vehicle 22 approaching modulation module 15 first encounters reflected FOI zone 18 (i.e. reflected FOI is provided by transmitter module 21 illumination which is reflected by modulation module 15), while advancing closer to modulation module 15 encounters a second reflected FOI zone 16 and while advancing closest to modulation module 15 encounters the third reflected FOI zone 14. Traffic sign 12 may be any conventional and known traffic sign, such as a stop sign, yield sign and alike, whereby each sign may have its own illumination characteristics and FOI reflected zones 14, 16, and 18, respectively, such as provided by transmitter module 21 and modulation module 15. Accordingly, each of the signs and its associated FOI zones having unique electro-optical characteristics typifying the type of sign used, distance to sign, closing velocity to sign and alike. For example, a stop sign utilizes modulation reflections having FOI zones 14, 16, and 18 typified by particular electro-optical characteristics, while a yield sign may utilize modulation reflections having other types of electro-optical characteristics.

As describe herein, optical characteristics providing FOI are adapted to be transparent and unnoticeable to drivers, pedestrians and/or other observers that may be close, or in the vicinity of the FOI. Hence, illuminator module 10 and transmitter module 21 are adapted to operate using electromagnetic wavelengths, such as those in the invisible region such as NIR and alike. Illuminator module 10, transmitter module 21 and receiver module 20 are adapted to work in daytime, nighttime, during various ambient lighting conditions and/or various outdoor seasonal conditions, such as those experienced during summer and/or winter, at various temperatures and/or at various weather conditions including storms, rain, ice, dust and so forth. In so doing, illuminator module 10, transmitter module 21, modulation module 15 and receiver module 20 are adapted to provide an output signals for overcoming any of the aforementioned ambient and outdoor conditions, yet, sufficient output signals to remain unnoticeable and safe.

In order to achieve a sufficient Signal to Noise Ratio (SNR) in receiver module 20 (e.g. imaging sensor such as CMOS, CCD, image intensifier coupled to a CMOS or a detector such as photo-diode, avalanche photo-diode etc.) signals provided by illuminator module 10 or reflected by modulation module 15, can be accomplished by at least two methods. The first utilizes a pulsed method, such that the receiver module 20 can distinguish those illumination signals by synchronization, as provided by illuminator module 10 or signals reflected by modulation module 15, from other ambient and/or extraneous signals originating from continuous and/or otherwise random or not random parasitic electromagnetic sources. The second method utilizes modulated signals, such that the receiver module 20 can distinguish those illumination signals by synchronization, as provided by illuminator module 10 or signals reflected by modulation module 15, from other ambient and/ or extraneous signals originating from continuous and/or otherwise random or not random parasitic electromagnetic sources. Thus, by virtue of illuminating receiver module 20 with pulsed or modulated signals, as provided by illuminator module 10 or as reflected by modulation module 15, receiver module 20 synchronizes to the received signals, such that the receiver module 20 locks onto pulsed or modulated signals, thereby differentiating such signals from noise and other ambient/background signals to which the receiver module 20 may be exposed.

Further, illuminator module 10 or modulation module 15 can be powered by a direct power feed, such as provided by an electrical power line, and/or by a battery source and/or by a solar cell or any other power feed available at a location where sign 12 is located. Scope of illumination by the illuminator module 10 or modulation module 15 of an area, such as one covered by zones 14, 16, and 18 of embodiment of the present invention described in FIG. 1, FIG. 2, FIG. 3A, FIG. 3B and FIG. 3C, i.e., one in which an approaching vehicle 22 may be moving through, may be determined through system geometrical considerations. These system geometrical considerations, maybe such as those taking into account; height of illuminator module 10 or of modulation module 15, location of sign 12, geometrical extent of the FOI provided by illuminator module 10 or provided by modulation module 15 reflection and viewing angle of the illuminator module 10 or of modulation module 15.

The extent to which any of the zones 14, 16, and 18 of embodiment of the present invention described in FIG. 1, FIG. 2, FIG. 3A, FIG. 3B and FIG. 3C, may be illuminated is based on desired minimal and/or maximal distances those zones and/or illuminator module 10 or of modulation module 15 may be disposed away from an approaching motor vehicle 22 moving toward the illuminator module 10 or of modulation module 15. Determination of the extent of the width of the zones 14, 16, and 18 can also take into account width of the road on which the motor vehicle 22 is moving. Thus, in accordance with the present technique, it may be desirable to determine a distance of an approaching motor vehicle 22 from the illuminator module 10 or of modulation module 15. This could be achieved by taking into account height (as determined by the height of sign 12) of the illuminator module 10 or of modulation module 15, as well as the FOI angles, thereby requiring each of the illumination zones 14, 16, and 18 (as provided by illuminator module 10 or of by modulation module 15) to have different electro-optical characteristics.

Figure 4A:
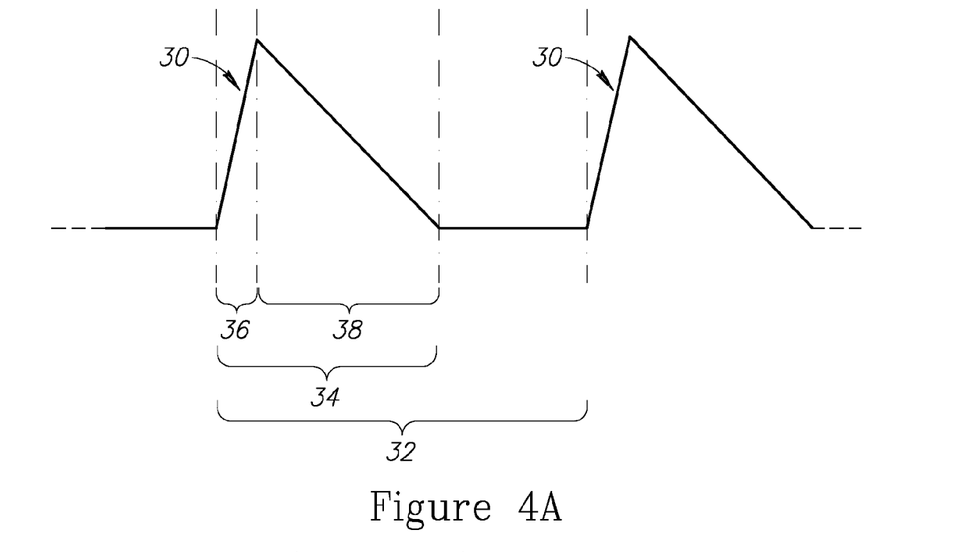
FIG. 4A-FIG. 4B illustrate an illumination pulses, in accordance with an embodiment of the present technique.
Figure 4B:
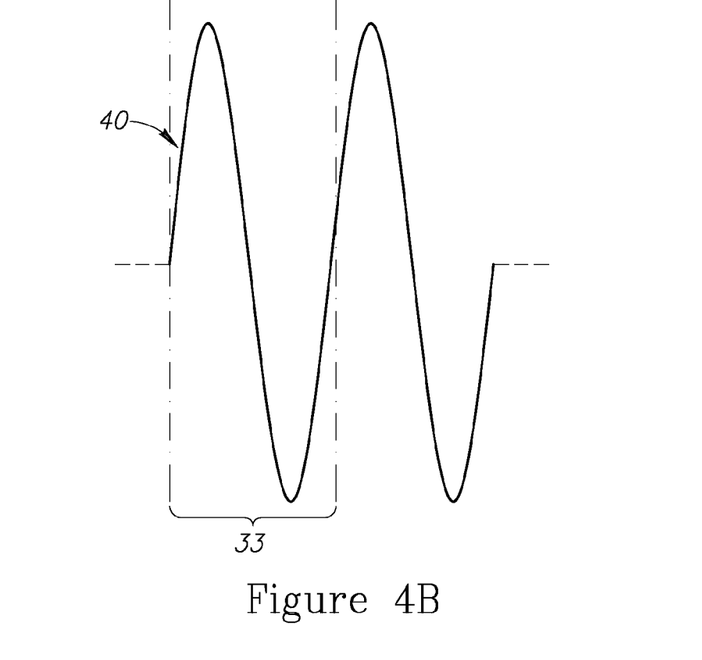

FIG. 4A and FIG. 4B illustrate an illumination pulses; the first illumination pulses 30 and the second illumination modulation 40 which are provided by illuminator module 10 or modulation module 15. Each of the zones 14, 16, and 18 in FIG. 1, FIG. 2, FIG. 3A, FIG. 3B and FIG. 3C, may be made up of illumination pulses having different pulse characteristics, thereby typifying each of the zones 14, 16, and 18, as well as differentiating each zone from the other zones. Furthermore, each of the zones 14, 16, and 18 in FIG. 1 and FIG. 2, may be illuminated by a signal having a specific period, as defined by region 32 and a pulse width 34 as illustrated in FIG. 4A. Similarly, each of illuminated zones 14, 16, and 18 in FIG. 1 and FIG. 2, may also have a characteristic pulse rise time 36, and pulse fall time 38 as illustrated in FIG. 4A. Alternatively, the zones 14, 16, and 18 in FIG. 1 and FIG. 2, can be illuminated by a signal having a specific modulation (duty cycle), as defined by region 33 of signal 40 in a case where a Continuous Wave (CW) illumination is used, as illustrated in FIG. 4B. In another embodiment as illustrated in FIG. 3A, FIG. 3B and FIG. 3C, in each of the zones 14, 16, and 18 a different reflected illumination signal is provided by modulation module 15 having a specific period, as defined by region 32 and a pulse width 34 as illustrated in FIG. 4A. Similarly, each of illuminated zones 14, 16, and 18 may also have a characteristic pulse rise time 36, and pulse fall time 38 as illustrated in FIG. 4A. Alternatively, the zones 14, 16, and 18 in FIG. 3A, FIG. 3B and FIG. 3C, can be illuminated by a signal having a specific modulation (duty cycle), as defined by region 33 of signal 40, as illustrated in FIG. 4B. In addition, each electromagnetic illumination for each zone may also be characterized in its polarization. In addition, illumination module 10 or transmitter module 21 coupled to modulation module 15 may provide other types of electro-optical characteristics, for illumination pulses 30 and for illumination modulation 40, typifying each of the zones 14, 16, and 18, by its illumination polarization, illumination wavelength, illumination spectral wavelength width, or any combination of the aforementioned characteristics.

In accordance with the present technique, illumination pulses, such as pulses with period 32 in FIG. 4A or CW modulation 33 in FIG. 4B, may be part of a synchronization scheme providing a desirable Signal to Noise Ratio (SNR) for receiver module 20, such as the receiver module 20 placed on vehicle 22, receiving the varying pulses or CW modulation with their distinct electro-optical characteristics as the vehicle 22 is continuously moving through the zones 14, 16, and 18 of embodiment of the present invention described in FIG. 1 and FIG. 2. In order to achieve a safe and suitable signal in disclosed embodiment, while taking into account considerations such as electric power consumption, SNR, and so forth, the present technique may utilize, for example, a high pulse peak power in FIG. 4A (e.g. 100 Watt) with a low pulse repetition rate (e.g. 100 Hz) resulting with a low average optical and electrical power of illuminator module 10. In another example, the present technique may utilize a low pulse peak power in FIG. 4A (e.g. 5 Watt) with high pulse repetition rate (e.g. 100 KHz) resulting with a low average optical and electrical power of illuminator module 10. In another example, the present technique may utilize a high modulation frequency 33 (higher than a few hundred Hz) in FIG. 4B for a module 10 CW illuminator light source. In order to achieve a safe and suitable signal in another embodiment, while taking into account considerations such as electric power consumption of modulation module 15, SNR, and so forth, the present technique may utilize, for example, a high illumination optical power at the relevant spectral wavelength (i.e. relevant to receiver module 20 spectral working point) provided by transmitter module 21 correlated with modulation module 15 reflected illumination signal.

Figure 5:
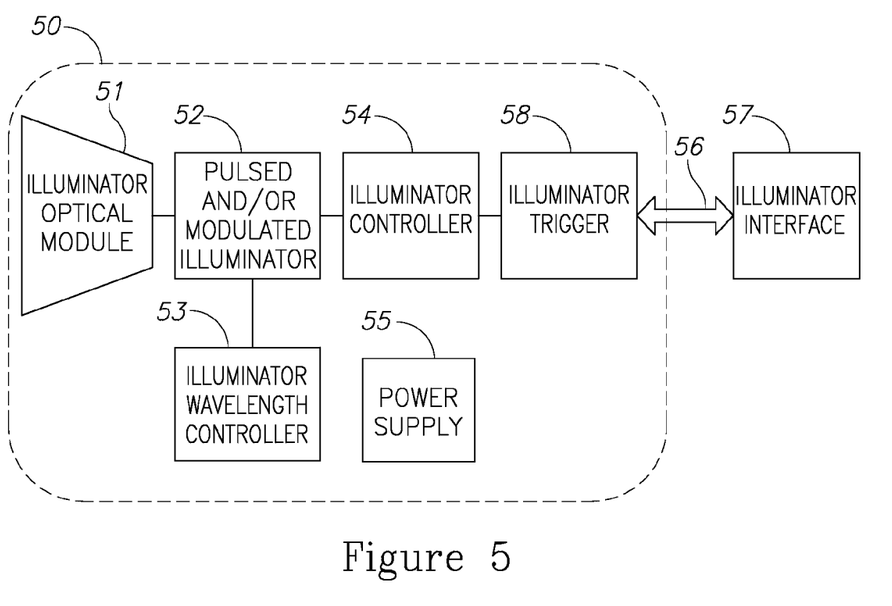
FIG. 5 is a block diagram of an illuminator module, in accordance with an embodiment of the present technique.

As illustrated by FIG. 5 for disclosed embodiment, system 50 is provided in accordance with an exemplary embodiment of present technique. System 50 is similar to illuminator module 10 illustrated in FIG. 1 and FIG. 2, including similar mechanical, electrical, optical hardware and/or software components. Hence, the depiction of FIG. 5, as given by system 50, is a detailed diagram showing various internal components, from which various modifications of those internal components can be housed and/or used by illuminator module 10, as appreciated by those having ordinary skill. Accordingly, system 50 includes illuminator optical module 51, adapted for projecting and/or filtering light polarization. Illuminator optical module 51 may further be adapted for diffusing light (e.g. holographic diffuser, optical lenses etc.) and projecting one or more of the FOI zones 14, 16, and 18. System 50 further includes a pulsed and/or modulated illuminator 52 (e.g. LED, LASER, flash lamp, etc.) to provide pulsed illumination 30 in FIG. 4A and/or to provide modulated illumination 40 in FIG. 4B. System 50 may include an illuminator wavelength controller 53 based on an electrical method (e.g. thermo electric cooler), and/or suitable mechanical method and/or any optical method and device for stabilizing illumination wavelengths, as appreciated by those having ordinary skill in the art. System 50 further includes illuminator controller 54, illuminator trigger 58 and system 50 power supply 55. Illuminator controller 54 is adapted to drive pulsed and/or modulated illumination 52, adapted to control illuminator wavelength controller 53, adapted to provide system electrical feeds from power supply 55 and to receive trigger signal from illuminator trigger 58. Illuminator trigger 58 (as an option) triggers the system 50 to provide at least one FOI as to approaching vehicle 22 position to the relevant FOI zone 14, 16, and 18 as illustrated in FIG. 1 and FIG. 2. Illuminator trigger 58 triggering mechanism, may be based on an acoustic sensor, a pyroelectric sensor and alike, with requirements to be low power consumption and to have a high probability of triggering as to approaching vehicle. These illuminator trigger 58 main requirements aforementioned enable power management and life durability of illumination system 50. System 50 further includes illuminator interface 57 including a mechanical interface adapted for use during instillation of system 50, as well as an electric interface, such as one adapted for a traffic light lighting indication. For example, prior change of traffic "Green" light indication to "Red" light indication, illuminator interface 57 receives the coming traffic light indication change and via connection 56, triggers the illuminator trigger 58 to set illuminator controller 54 to a different working mode. In addition, illuminator controller 54 different working mode may change yonder zone (i.e. the further FOI as to traffic light) FOI electro-optical characteristics, aforementioned, from a "Green" traffic light indication to a "Red" traffic light indication.

Figure 6:
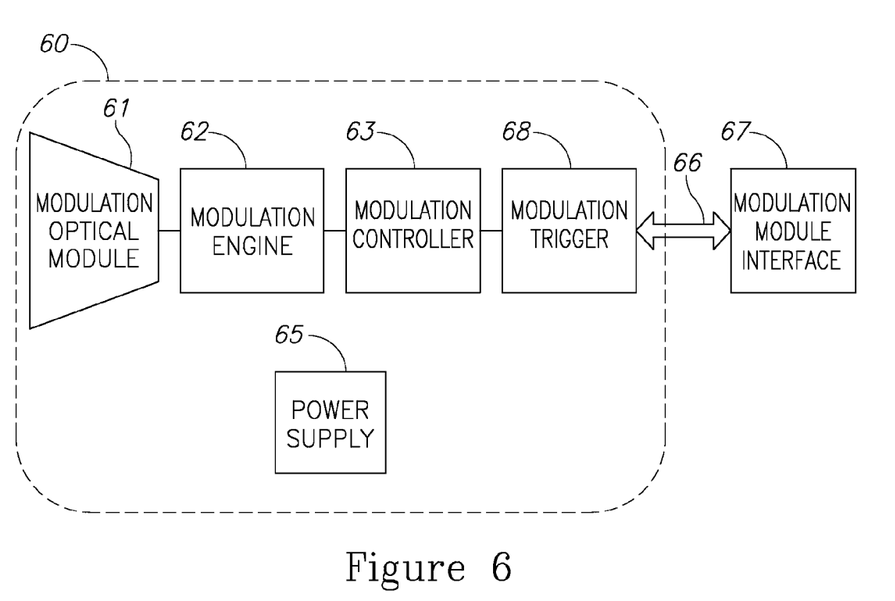
FIG. 6 is a block diagram of a modulation module, in accordance with another embodiment of the present technique.

As illustrated by FIG. 6 for another embodiment, system 60 is provided in accordance with an exemplary embodiment of present technique. System 60 is similar to modulation module 15 illustrated in FIG. 3A, FIG. 3B and FIG. 3C, including similar mechanical, electrical, optical hardware and/or software components. Hence, the depiction of FIG. 6, as given by system 60, is a detailed diagram showing various internal components, from which various modifications of those internal components can be housed and/or used by modulation module 15, as appreciated by those having ordinary skill. Accordingly, system 60 includes modulation optical module 61, adapted for receiving/projecting illumination, may further be adapted to filter light polarization, and may further be adapted to filter certain wavelength spectrums, as may be performed by a band pass filter. Modulation optical module 61 may further be adapted for receiving and reflecting light onto one or more of the relevant FOI 14, 16, and 18 originated by transmitter module 21 CW illumination. System 60 further includes a modulation engine 62, adapted for converting CW illumination to pulsed illumination 30 in FIG. 4A and/or to modulated illumination 40 in FIG. 4B. In addition, modulation engine 62 is adapted for reflecting most of the received incident optical power illumination in the same AOA as to the illumination origin and adapted to modulate the incident CW illumination. Furthermore, modulation engine 62 is adapted to provide different modulations (e.g. different electro-optical parameters) based on different AOA incident illumination as illustrated in FIG. 3A, FIG. 3B and FIG. 3C where each FOI zone 18, 16, and 14 has different electro-optical parameters. An example for modulation engine 62 may be an optical retro-reflector with an optical chopper where the optical chopper slits dimensions are positioned to provide the desired reflected FOI different zones. System 60 further includes modulation controller 63 adapted to drive modulation engine 62, adapted to provide system electrical feeds from power supply 65 and to receive trigger signal from modulation trigger 68. Modulation trigger 68 triggering mechanism, may be based on an acoustic sensor, a pyroelectric sensor and alike, with requirements to be low power consumption and to have a high probability of triggering as to approaching vehicle. These modulation trigger 68 main requirements aforementioned enable power management and life durability of modulation system 60. System 60 further includes modulator module interface 67 including a mechanical interface adapted for use during instillation of system 60, as well as an electric interface, such as one adapted for a traffic light lighting indication. For example, prior change of traffic "Green" light indication to "Red" light indication, modulator module interface 67 receives the coming traffic light indication change and via connection 66, triggers the modulation trigger 68 to set modulation controller 63 to a different working mode. In addition, modulation controller 63 different working mode may change yonder zone (i.e. the further reflected FOI as to traffic light) FOI electro-optical characteristics, aforementioned, from a "Green" traffic light indication to a "Red" traffic light.

Figure 7:
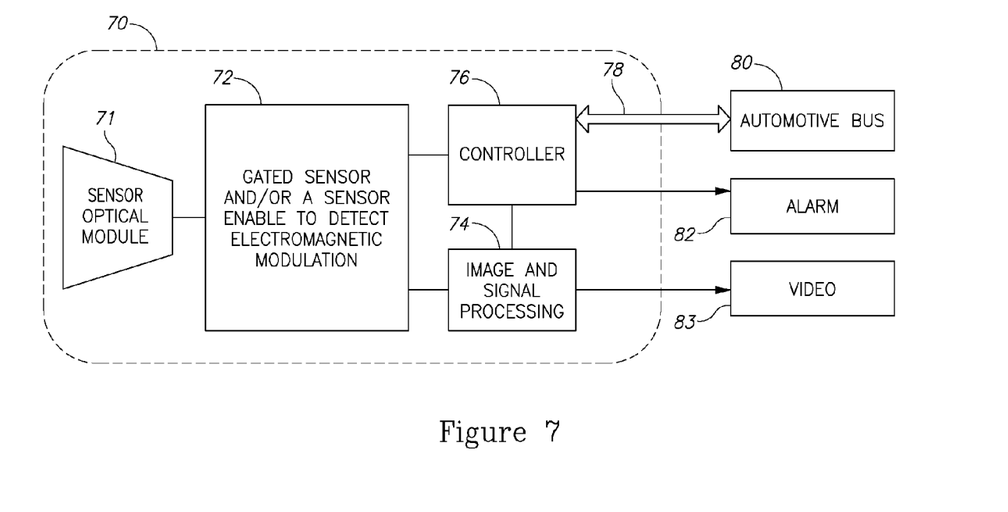
FIG. 7 is a block diagram of a receiver module, in accordance with an embodiment of the present technique.

FIG. 7 illustrates a receiver module 70, in accordance with an embodiment of the present technique. It should be born in mind that the receiver module 70 is similar to receiver module 20 coupled to vehicle 22, as discussed hereinabove with reference to FIG. 1, FIG. 2, FIG. 3A, FIG. 3B and FIG. 3C. Hence, the depiction of FIG. 7, as given by receiver module 70, is a detailed diagram showing various internal components, from which various modifications of those internal components can be housed and/or used by the receiver module 70, as appreciated by those having ordinary skill. Accordingly, receiver module 70 includes a sensor optical module 71, such as one adapted to operate and detect electromagnetic wavelengths similar to those provided by illuminator module 50 or reflected by modulator module 60. Sensor optical module 71 is further adapted for filtering certain wavelength spectrums, as may be performed by a band pass filter. Sensor optical module 71 is further adapted to filter various light polarizations and/or be adapted for focusing incoming light onto light sensitive area of the receiver module 70. Further, receiver module 70 includes a gated sensor and/or a sensor 72 adapted and enabled to detect electromagnetic modulation— including a synchronization mechanism adapted for detecting electromagnetic signals, originating from the illuminator module 50 or reflected by modulator module 60, and propagating within illumination pulse regions, described above. Gated sensor 72 may be an existing sensor in vehicle 22 such as for night vision and/or day vision and/or range measurements etc. or as an 'add on' system. Receiver module 70 further includes an image and signal processing 74, a controller 76, and an electrical interface 78, adapted to interface with the motor vehicle communication bus 80, alarm module 82, and video module 83. Image and signal processing 74, where it serves as a vision sensor, may combine (fuse) image with received indication data (e.g. type, location, estimated range etc.). Alarm module 82 (optional) is adapted for alerting and/or indicating to the driver detected various road indications by means of visual warning such as, displaying type of road indication and/or distance to road indication on existing vehicle display, "fusing" type of road indication and/or distance to the road indication may be displayed by video module 83. Audio warnings may also be provided by the alarm module 82 such as, stereophonic alert with the direction of the road indication and/or an audio alert for type of road indication and/or distance to road indication.

In another embodiment, a transmitter module 21 is provided in the vehicle 22, adapted to supply a CW illumination in an adequate spectral wavelength (e.g. reflected from modulation module 60 and received in receiver module 70), adapted to illuminate a specific FOI and adapted to provide a sufficient CW illumination intensity. Transmitter module 21 may be at least one of vehicle's 22 front head lights (i.e. front vehicle high beam light, front vehicle low beam light, front vehicle fog beam light etc.) and/or may be a dedicated light source in the vehicle. Transmitter module 21 may be located in side vehicle 22 passenger compartment and/or externally located in an existing vehicle 22 head light (as an 'add on') and as a 'stand alone' in vehicle front location (e.g. vehicle grill, vehicle roof etc.).

In the disclosed embodiment, an illuminator module 50 illuminates continuously and/or partly (e.g. illumination is enabled only when a vehicle is approaching the relevant FOI) a particular FOI, in accordance with a defined zone adapted to be illuminated with certain electromagnetic signature. For example, as illustrated by FIG. 1 and FIG. 2, an exemplary stop sign 12 is shown as being associated with various FOI zones. In the illustrated example, a zone, such as the first zone 14, whose length may be 30 meters long may be illuminated with pulses having duration of 1 microsecond with frequency of 10 KHz. A second zone 16 extending between the first 30 m and 50 m may be illuminated with pulses having length of 1 micro-second with a frequency of 15 KHz.

According to another embodiment, a transmitter module 21 illuminates continuously and/or partly (e.g. may illuminate in specific time intervals which will not miss any indication in transmitter FOI), a reflected modulated illumination defines zone adapted to be illuminated with certain electromagnetic signature. For example, as illustrated by FIG. 3B, FIG. 3C and FIG. 3A, an exemplary stop sign 12 is shown as being associated with various FOI zones as vehicle 22 approaches indication 12. In the illustrated example, a zone, such as the first zone 14, whose length may be 30 meters long, may reflect transmitter module 21 CW illumination by modulation module 60 with modulation of 1 KHz. A second zone 16 extending between the first 30 m and 50 m may reflect transmitter module 21 CW illumination by modulation module 60 with modulation of 10 KHz.

In the described embodiment as illustrated by FIG. 1 and FIG. 2, an illuminator 50 may be indicative of a traffic light having two FOI zones and three types of indications representing three colors corresponding to the colors of the traffic light. In such an example, a "Red" light may be represented by pulses lasting 2 microseconds with frequency of 10 KHz for FOI zone extending up to 30 m 14, whereas for the zone extending from 30 m to 50 m 16, pulses of 2 microseconds with frequency of 15 KHz may be provided for indicating the "Red" light. Similarly, a "Yellow" light may be indicated in the first FOI (30 meters zone 14) by pulses of 3 microseconds with frequency 10 KHz, while for the second FOI (30 m to 50 m zone 16), the "Yellow" light signal may be represented by pulses lasting 3 microseconds at a frequency of 15 KHz. Still by further example, a "Green" light may be represented by pulses lasting 3 microseconds at frequency of 5 KHz for FOI zone extending up to 30 m 14, while the second zone extending between 30 to 50 m 16 may be illuminated with pulses lasting 3 microseconds at frequency of 25 KHz.

By further example, an illuminator module 50 may be indicative of a traffic light having two FOI zones. In such an example, the closer FOI zone relative to the illuminator module 50 has a lower repetition rate (10 KHz), while the second FOI zone has a higher repetition rate (15 KHz). Thus, by this method, even if the receiver module 70 does not detect some of the illuminator pulses, it will still indicate a presence of lower repetition rate region, hence, an indication of a closer FOI, as received by the receiver. This method enables an additional safety level of the system.

By further example, a modulator module 60 may be indicative of a traffic light having two FOI zones. In such an example, the closer FOI zone relative to the modulator module 60 has a lower modulation (10 KHz), while the second FOI zone has a higher modulation (20 KHz). Thus, by this method, even if the receiver module 70 does not detect some of the reflected modulated illumination, it will still indicate a presence of lower modulation rate region, hence, an indication of a closer FOI, as received by the receiver module 70. This method enables an additional safety level of the system.

By further example, prior traffic light changes from "Green" to "Red" or from "Red" to "Green" each zone may indicate a different traffic light type. In such an example, a yonder zone from traffic light may indicate approaching vehicle a "Red" traffic light while a closer zone from traffic light may indicate approaching vehicle a "Green" traffic light. This enables a unique safety feature for vehicle driver approaching a junction with traffic light and a smoother traffic flow.

Consistent with some embodiments of the invention, receiver module 70 may be configured to assess information from traffic-signs which exhibit visual indicators that change over time. Such time-variant traffic-signs may include, for example, digital road signs and traffic lights. In accordance with the invention, some of these time-variant traffic-signs are further configured to transmit temporal data relating to the time-variant visual indicators. The temporal data, received and analyzed by receiver module 70, may include, for example—the time period before the next change in the visual indicators. In implementing this embodiment receiver module 70 may include a sensor 71 attached to a vehicle and configured to determine a type of one or more traffic-signs that are present in a scene containing the vehicle, out of a predefined set of traffic-signs, wherein at least some of the traffic-signs are time-variant traffic-signs which present time-variant visual indicators. Module 70 further includes a controller 76 configured to: monitor and analyze, in real time: (a) relative metrics indicative of one or more spatial relations between the vehicle and the one or more detected traffic-signs; and (b) temporal data associated with the time-variant visual indicators of the time-variant traffic-signs. Additionally, controller 76 is further configured to apply one or more decision functions to at least two of: (i) the detected one or more traffic-signs and to (ii) the monitored relative metrics, and (iii) the temporal data associated with the time-variant visual indicators, so as invoke an action selected from a predefined set of actions. Thus, according to the aforementioned embodiment, in case time-variant traffic-signs are present in the scene, the additional data relating to the time-variant visual indicators is further used in the analysis and decision making process of receiver module 70.

According to some embodiments of the invention, the type of the traffic-sign may be determined by receiving a unique identifier wither transmitted (e.g., a modulated electromagnetic wave) or visually exhibited thereon. Alternatively, receiver module 70 may determine the type of the traffic-sign by comparing the location of the detected traffic-sign with a map of traffic-signs which associates locations with traffic-signs.

Figure 8:
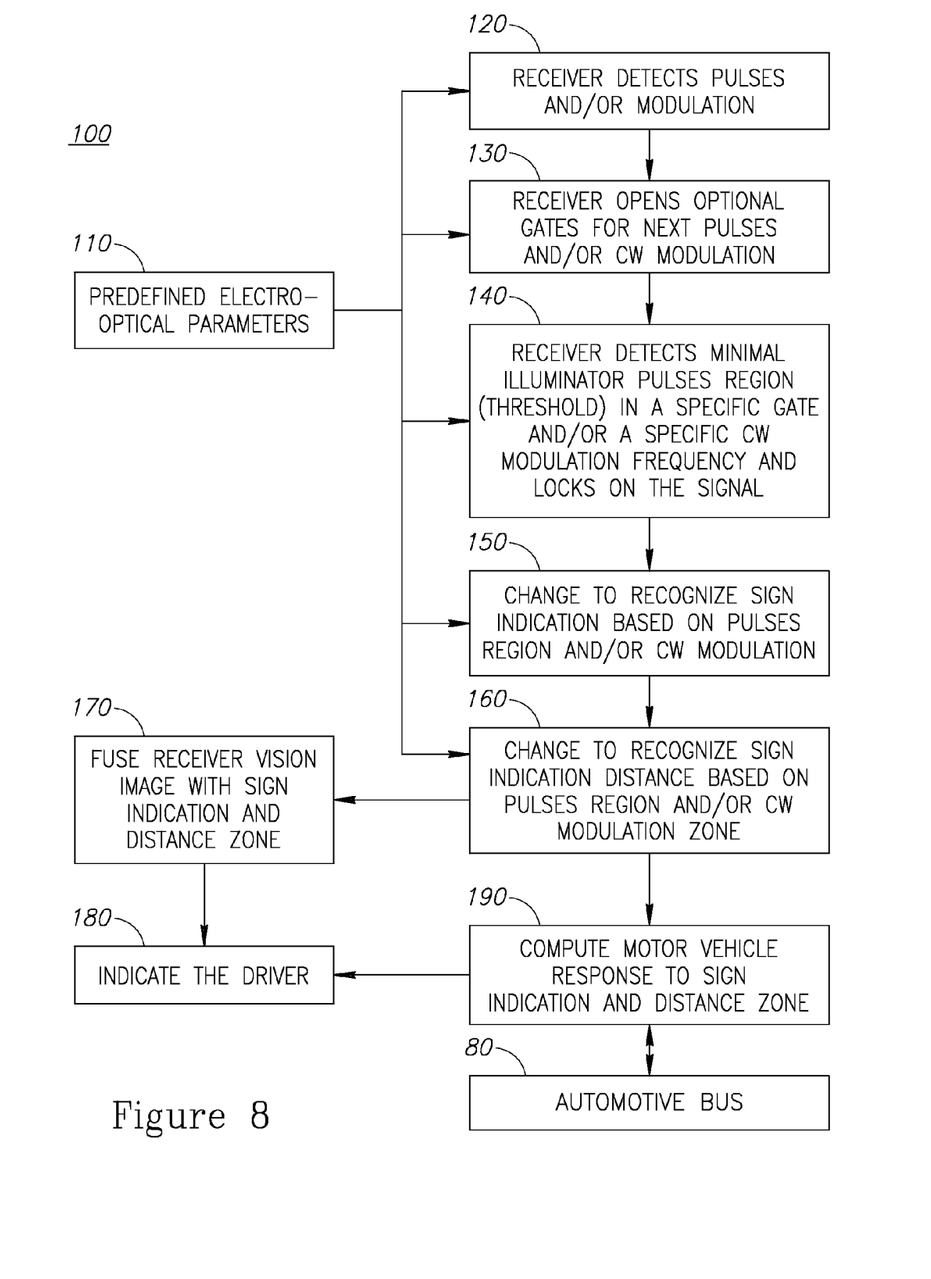
FIG. 8 is a process flow, in accordance with an embodiment of the present technique.

FIG. 8 is a chart describing a process flow 100 in receiver module 70. At step 120, once the motor vehicle enters a FOI zone a receiver module 70 coupled to the vehicle, detects first pulses (pulsed and/or modulated) originating from the illuminator module 50 or reflected by modulation module 60. At step 130 the receiver module 70 "opens" next optional timing gates (such as those based on predefined gates as defined for all optional required indications of step 110) for a pulsed/modulated illumination originating from illumination module 50 and/or pulsed/modulated illumination originating from reflected illumination of modulation module 60. Once accumulated pulses surpass a specific threshold, as provided in step 140, the pulses sequence becomes "locked," and at step 150 the signal is then processed and compared to the predefined indications 110, whereby the signal is recognized. In accordance with a corresponding type of FOI zone in which the signal is received, at step 160, the signal is processed and recognized. Predefined Electro-Optical indications 110 may also mange the priority of the traffic sign detection (i.e. module 130 in process flow 100) and/or the alert priority of each detected traffic indication to the driver indication 180 in multiple road indication scenery (e.g. stop sign in 100 m and yield sign 50 m from the vehicle etc.).

At step 170 an image is formed to include an indication of a recognized traffic sign with distance zone (if existing). At step 180 the indications of step 170 are provided to the driver of the vehicle. That is, the driver can be alerted visually or by using audio signals, such as those produced by particular sounds in accordance a location of the vehicle relative to the sign. At step 190, vehicle response (e.g. speed, acceleration and etc.), as well as distance of vehicle to the traffic sign is computed and/or sent to the vehicle communication bus 80. This information is also provided to the driver, as provided at step 180 along with any accompanying deceleration, accelerating or any other stop and go related features in the motor vehicle that may be actively provided by the driver.

What is claimed is:

1. A system comprising:
    a gated sensor attached to a vehicle and configured to receive near infrared (NIR) pulsed and/or continuous wave (CW) modulated illumination signals from a scene, and to detect one or more traffic-signs that are present in the scene, wherein at least some of the traffic-signs are time-variant traffic-signs which present time-variant visual indicators; and
    a controller configured to:
        synchronize the gated sensor with said received NIR pulsed and/or CW modulated signals to yield at least one image of the one or more traffic-signs that are present in the scene;
        monitor and analyze, in real time and with respect to the at least one image:
            relative metrics indicative of one or more spatial relations between the vehicle and the one or more detected traffic-signs; and
            temporal data associated with the time-variant visual indicators of the time-variant traffic-signs, and
        apply one or more decision functions to at least two of: the detected one or more traffic-signs, the monitored relative metrics, and the temporal data associated with the time-variant visual indicators, to invoke an action selected from a predefined set of actions.

2. The system according to claim 1, wherein the sensor is configured to determine a type of the traffic-sign by receiving and analyzing pulsed and/or modulated signals, wherein the received pulsed and/or modulated signals are indicative of the type of the traffic-sign.

3. The system of claim 2, wherein the received pulsed and/or modulated signals are associated with a unique identifier of a specific traffic-sign.

4. The system according to claim 1, wherein the sensor is further configured to determine a type of the traffic-sign by comparing a location of a detected traffic-sign based on the received signals, with a map that associates locations with specific traffic-signs.

5. The system of claim 2, wherein the pulsed and/or modulated signals comprise a pulsed and/or modulation frequency, respectively.

6. The system of claim 2, wherein the pulsed signals are received over predetermined regions through which the vehicle is travelling.

7. The system of claim 6, wherein each of the predetermined regions has a predetermined length.

8. The system of claim 6, wherein a frequency of the pulsed signals received by the receiver depends on the predetermined region through which the vehicle is travelling.

9. The system of claim 8, wherein the frequency of the pulsed and/or modulated signals is higher in regions farther from the indicator than regions closer to the indicator.

10. The system of claim 1, wherein the system is adapted to be retrofitted within the vehicle, and wherein the system is adapted to be used with any one of systems included within the vehicle including day/night vision systems, vision sensors, cameras, and/or global positioning systems.

11. The system of claim 2, comprising a polarization filter adapted to discriminate between different polarizations of the received pulsed and/or modulated signals.

12. A method comprising:
  receiving, via a gated sensor, CW NIR pulsed and/or modulated illumination signals from a scene;
  detecting, from a vehicle, one or more traffic-signs that are present in a scene, wherein at least some of the traffic-signs are time-variant traffic-signs which present time-variant visual indicators;
  synchronizing the gated sensor with said received CW NIR pulsed and/or modulated signals to yield at least one image of the one or more traffic-signs that are present in the scene;
  monitoring and analyzing, in real time and with respect to the at least one image:
    relative metrics indicative of one or more spatial relations between the vehicle and the one or more detected traffic-signs; and
    temporal data associated with the time-variant visual indicators of the time-variant traffic-signs; and
  applying one or more decision functions to at least two of: the detected one or more traffic-signs, the monitored relative metrics, and the temporal data associated with the time-variant visual indicators, to invoke an action selected from a predefined set of actions.

13. The system according to claim 1, wherein the controller is further configured to fuse the image with at least one of: the detected one or more traffic-signs, and to the monitored relative metrics, and the temporal data associated with the time-variant visual indicators.

14. The method according to claim 12, further comprising fusing the image with at least one of: the detected one or more traffic-signs, and to the monitored relative metrics, and the temporal data associated with the time-variant visual indicators.

* * * * *